United States Patent
Manushi et al.

(10) Patent No.: US 11,002,937 B2
(45) Date of Patent: May 11, 2021

(54) CAMERA LENS ASSEMBLY

(71) Applicants: Robert Bosch LLC, Broadview, IL (US); Robert Bosch GmbH, Stuttgart (DE)

(72) Inventors: Ligor Manushi, Northville, MI (US); John Janson, Plymouth, MI (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 273 days.

(21) Appl. No.: 15/915,544

(22) Filed: Mar. 8, 2018

(65) Prior Publication Data

US 2019/0278045 A1    Sep. 12, 2019

(51) Int. Cl.
  *G02B 7/02*   (2021.01)
  *G02B 1/04*   (2006.01)
  *G02B 27/00*  (2006.01)

(52) U.S. Cl.
  CPC ............ *G02B 7/021* (2013.01); *G02B 1/041* (2013.01); *G02B 27/0006* (2013.01)

(58) Field of Classification Search
  CPC .......... G02B 7/02; G02B 7/021; G02B 7/022; G02B 7/023; G02B 7/026; G02B 13/001; G02B 7/04; G02B 27/62; G02B 7/003; G02B 7/102; G02B 6/4204; G02B 6/4292; G02B 7/028; G02B 7/08; G02B 7/14; G02B 13/003; G02B 15/14; G02B 23/2476; G02B 25/001; G02B 25/02; H01L 2224/48091; H01L 2924/00; H01L 2924/00014; H01L 2924/0002; H01L 2924/181; H01L 2924/3025; H01L 2224/48247; H01L 2924/00012; H01L 33/58; H01L 21/67173; H01L 21/6719; H01L 21/67253; H01L 21/6776; H01L 21/681; H01L 2223/54453; H01L 2223/5446; H01L 23/544; H01L 27/14621; H01L 27/14627;

(Continued)

(56) References Cited

U.S. PATENT DOCUMENTS

2008/0100932 A1\*  5/2008  Noda .................... G02B 7/021
                                                              359/819
2009/0245767 A1\* 10/2009  Sakai ................. G02B 27/0006
                                                              396/25

(Continued)

FOREIGN PATENT DOCUMENTS

| JP | 2006349752 | 12/2006 |
|----|-----------|---------|
| JP | 2018105904 | 7/2018 |
| WO | 2017169644 | 10/2017 |

OTHER PUBLICATIONS

PCT International Search Report for PCT/EP2019/054201.

*Primary Examiner* — William R Alexander
*Assistant Examiner* — Sharrief I Broome
(74) *Attorney, Agent, or Firm* — Kelly McGlashen; Maginot, Moore & Beck LLP (57) ABSTRACT

A lens assembly for a near range camera includes a lens stack disposed in a tubular lens housing. The lens stack includes several lenses in a stacked arrangement. An outermost lens of the lens stack is disposed in an open end of the lens housing, and a second lens of the lens stack abuts an inward facing surface of the outermost lens. A seal is that contacts, and forms a seal with, an inner surface of the lens housing, the first lens and the second lens.

19 Claims, 4 Drawing Sheets

(58) Field of Classification Search
CPC .... H01L 27/14632; H04N 2201/02458; H04N 5/2254; H04N 2201/02474; H04N 5/2253; H04N 2201/0241; H04N 2201/02412; H04N 2201/02431; H04N 2201/02449; H04N 2201/02481; H04N 2201/02483; H04N 2201/02485; H04N 5/2252; H04N 5/2257; H04N 9/3141; H04N 13/207; H04N 1/03; H04N 1/401; H04N 5/232; H04N 9/3102; G03B 21/142; G03B 3/10; G03B 17/00; G03B 17/02; G03B 17/14; G03B 17/28; G03B 11/045; G03B 17/04; G03B 21/145; G03B 21/28; G03B 2205/0069; G03B 27/52; G03B 29/00; G03B 37/06; G03B 3/02; G03B 5/00; G03B 7/083
See application file for complete search history.

(56) References Cited

U.S. PATENT DOCUMENTS

| | | | |
|---|---|---|---|
| 2012/0147489 A1* | 6/2012 | Matsuoka | G02B 7/025 |
| | | | 359/819 |
| 2013/0155311 A1* | 6/2013 | Grandin | H04N 5/2257 |
| | | | 348/335 |
| 2015/0244905 A1* | 8/2015 | Morishima | G02B 7/026 |
| | | | 348/148 |
| 2015/0268446 A1* | 9/2015 | Chen | G02B 9/62 |
| | | | 348/148 |

* cited by examiner

CAMERA LENS ASSEMBLY

BACKGROUND

Near range automotive cameras can be used individually or in combination with other cameras to monitor the environment outside a vehicle. In some automotive camera systems, several near range cameras are placed around the vehicle. For example, one camera is directed forward, another camera is directed rearward, and two side cameras are integrated into the vehicle exterior rear-view mirrors. For cameras each having an aperture of 190 degrees, the vehicle's entire surroundings are captured. The camera system also includes an ECU, which merges the camera images to form a 360-degree view and may combine them with distance information from ultrasonic sensors. This data can be used to generate a dynamic 3D images that represent objects in the vicinity of the vehicle.

Automotive cameras are subject to high mechanical stresses, considerable temperature fluctuations, and to the effects of moisture. When a camera that does not have a completely impervious design is used under the climatic conditions typical of automotive applications, this can lead to moisture condensation in the optical path. This in turn leads to degradation of the image quality. Moisture condensation is often observed when air of a high relative humidity resides inside of the camera for a length of time at elevated temperatures, and the camera is then cooled within a short period of time.

Autonomous vehicle technology is one example of an area in which the image quality obtained by a rear view and/or surround view near range vehicle camera can be critical to safe operation of the technology. Thus it is desireable to provide automotive cameras having lens assemblies that have improved imperviousness to moisture penetration.

SUMMARY

In some aspects, a camera lens assembly includes a tubular lens housing having an open end, and a lens stack disposed in the lens housing. The lens stack includes a first lens disposed in the lens housing open end, and a second lens disposed in the lens housing. The second lens has an outward facing surface that faces an inward facing surface of the first lens. The camera lens assembly also includes a lens seal that contacts, and forms a seal with, an inner surface of the lens housing, the first lens and the second lens.

In some aspects, a camera includes a camera housing having an opening, and a camera lens assembly disposed in the opening. The camera lens assembly includes a tubular lens housing having an open end, and a lens stack disposed in the lens housing. The lens stack includes a first lens disposed in the lens housing open end, and a second lens disposed in the lens housing. The second lens has an outward facing surface that faces an inward facing surface of the first lens. In addition, the camera lens assembly includes a lens seal that contacts, and forms a seal with, an inner surface of the lens housing, the first lens and the second lens.

In some embodiments, the first lens has a peripheral edge that faces the inner surface of the lens housing and the first lens has a non-uniform outer diameter such that a first lens shoulder is formed in the peripheral edge. The first lens shoulder faces the second lens, and the lens seal resides in a space defined by the first lens shoulder, the peripheral edge, the inner surface of the lens housing, and the outward facing surface of the second lens.

In some embodiments, the lens seal contacts, and forms a seal with, the first lens shoulder, the peripheral edge, the inner surface of the lens housing and the outward facing surface of the second lens.

In some embodiments, the lens seal is an annular gasket.

In some embodiments, the lens housing comprises a first end that defines the open end, a second end opposed to the first end, and a non-uniform inner diameter such that a housing shoulder is formed in the inner surface of the lens housing between the first end and the second end. In addition, the second lens has a peripheral edge that faces the inner surface of the lens housing, the second lens has a non-uniform outer diameter such that a second lens shoulder is formed in the peripheral edge, and the second lens shoulder abuts the housing shoulder.

In some embodiments, a portion of the second lens abuts a portion of the first lens so as to provide an annular region of contact between the first lens and the second lens; and the lens seal is disposed at a location that is disposed between the annular region of contact and the lens housing.

In some embodiments, a central portion of the inward facing surface of the first lens is concave, and a sealed space exists between the central portion and the outward facing surface of the second lens.

In some embodiments, the first lens and the second lens are each formed of glass.

In some embodiments, the first lens is formed of glass and the second lens is formed of plastic.

In some embodiments, the lens stack includes a longitudinal axis that extends through a center of each lens of the lens stack. The inward facing surface of the first lens and the outward facing surface of the second lens each have a non-linear profile when viewed in a cross section that includes the longitudinal axis. The inward facing surface of the first lens includes a first planar portion that is transverse to the longitudinal axis and a first angled portion adjoining the first planar portion that is acutely inclined relative to the first planar portion. In addition, the outward facing surface of the second lens includes a second planar portion that is transverse to the longitudinal axis and a second angled portion adjoining the second planar portion that is acutely inclined relative to the second planar portion. The first angled portion is disposed between the lens seal and the longitudinal axis, and faces the second angled portion, and the first planar portion is disposed between the first angled portion and the longitudinal axis, and faces the second planar portion.

In some embodiments, a seal is provided between selected lenses of the lens stack and the lens housing to prevent moisture from entering the camera housing. In addition, by placement of the seal at a strategic location between selected lenses of the lens stack and the lens housing. The air volume between the outermost lens and the second lens can be isolated from the interior space of the camera housing and any moisture it contains. For example, by providing a lens seal such as a gasket that forms a seal with the lens housing, the outermost lens and the second lens, moisture is prevented from entering a space between these two lenses where condensation tends to occur.

DETAILED DESCRIPTION

Figure 1:
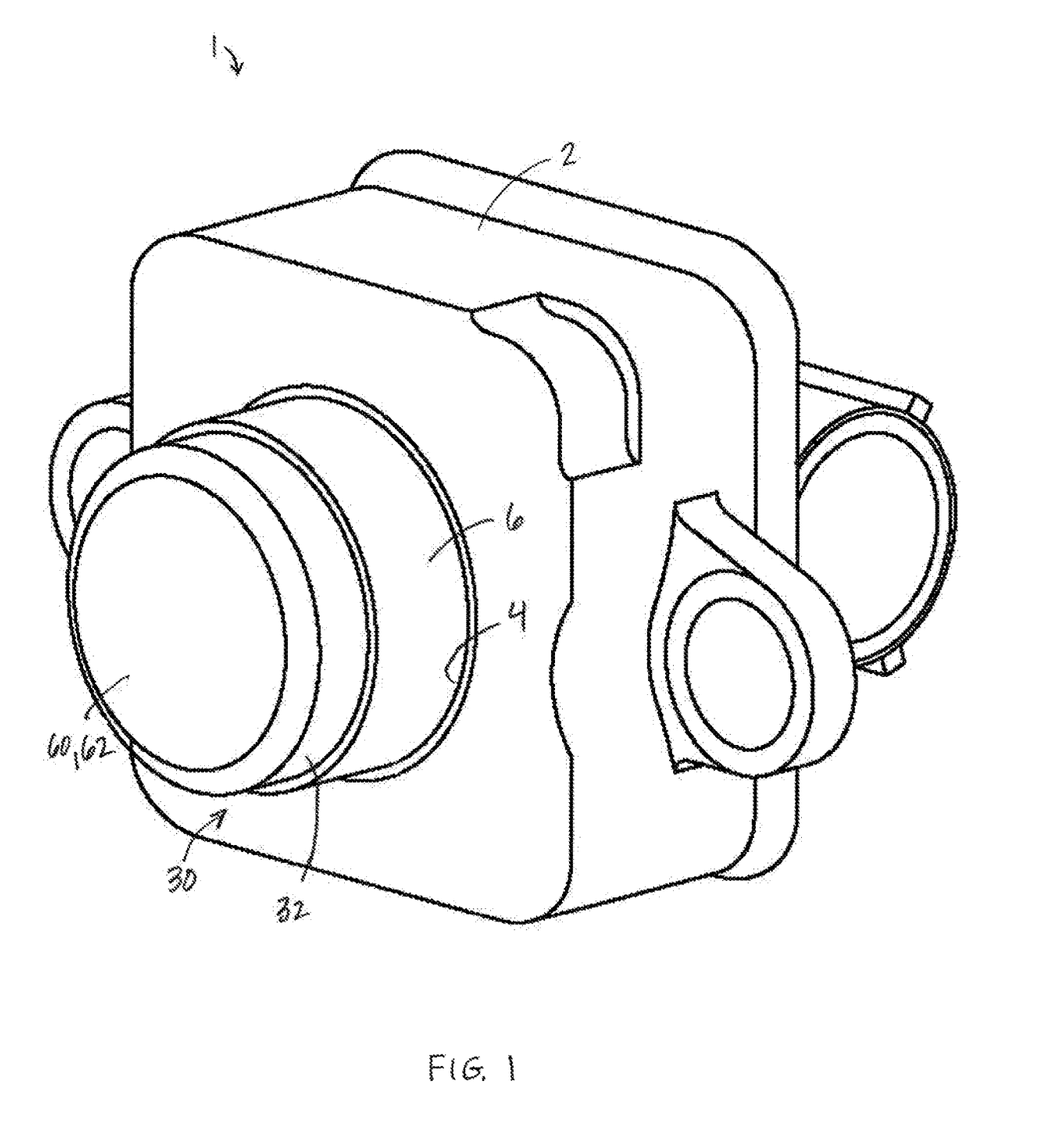
FIG. 1 is a perspective view of a near range automotive camera including a lens assembly.
Figure 2:
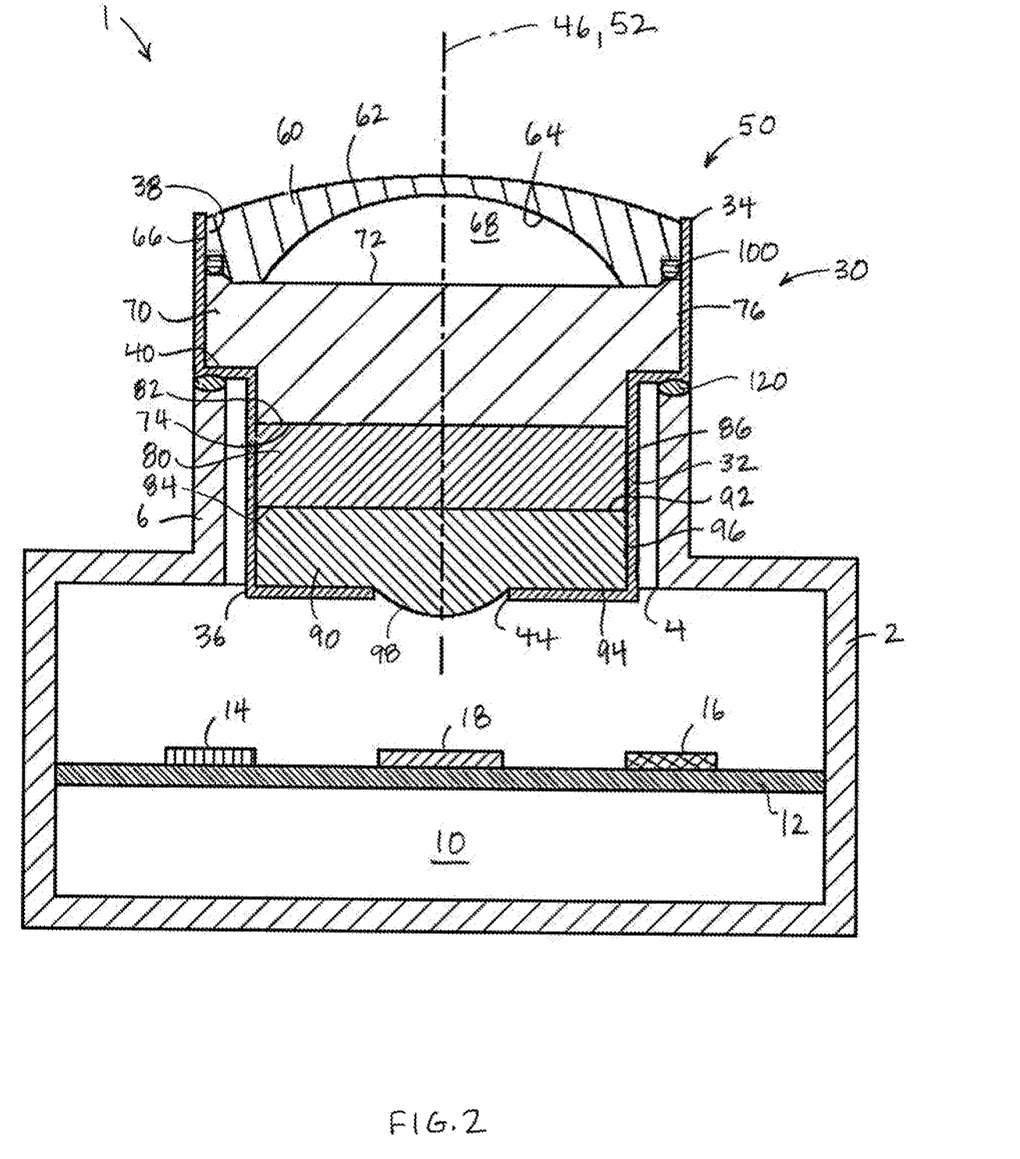
FIG. 2 is a schematic cross sectional view of the camera of FIG. 1 illustrating the lens assembly.

Referring to FIGS. 1 and 2, an automotive camera system used to monitor the environment of a vehicle may include one or more cameras. In some embodiments, the camera system includes at least one near range camera 1. The near range camera 1 includes a camera housing 2 that supports and protects a lens assembly 30, a printed circuit board (PCB) 12, and various electronic components that are disposed on the PCB 12. The electronic components may include, for example, an electronic control unit 14, memory 16, an image sensor 18 and other ancillary components used to operate the camera 1, store detected images and transfer information to and from the camera 1. Information may be transferred to and from the camera 1 via a wired connection (not shown) and/or wirelessly. The camera housing 2 defines an interior space 10, and includes an opening 4 that is aligned with the image sensor 18, and a tubular collar 6 surrounds the opening 4. The collar 6 protrudes outward from an outer surface of the camera housing 2 in a direction normal to the outer surface. The lens assembly 30 is supported within the collar 6 so as to be fixed relative to the camera housing 2 and so that an optical axis 52 of the lens assembly 30 intersects the image sensor 18, as discussed in detail below.

The lens assembly 30 includes a lens housing 32 that supports a lens stack 50 relative to the camera housing 2 and the image sensor 18. The lens housing 32 is a cylindrical tube having an open first end 34, a second end 36 opposed to the first end 34, and a longitudinal axis 46 extending between the first and second ends 34, 36. The lens housing 32 has a non-uniform diameter such that a diameter of the first end 34 is greater than a diameter of the second end 36, and a housing shoulder 40 is disposed between the first end 34 and the second end 36. In particular, the diameter of the first end 34 corresponds to an outer diameter of the collar 6, and the diameter of the second end 36 is less than an inner diameter of the collar 6. The second end 36 of the lens housing 32 is shaped and dimensioned to fit within the collar 6, and includes a central opening 44 through which light passes into the camera housing 2. The lens housing 32 is partially received within the collar 6 such that the second end 36 resides within the camera housing opening 4, and the housing shoulder 40 is supported on a terminal end of the collar 6. In addition, the first end 34 of the lens housing 32 resides outside the camera housing 2.

The lens stack 50 is disposed in and surrounded by the lens housing 32. The lens stack 50 includes several individual lenses in a stacked arrangement. In the illustrated embodiment, the lens stack 50 includes four lenses, for example a first lens 60, a second lens 70, a third lens 80 and a fourth lens 90. The four lenses 60, 70, 80, 90 are arranged such that an optical axis of each lens, and thus also an optical axis 52 of the lens stack 50, coincides with the longitudinal axis 46 of the lens housing 32.

Figure 3:
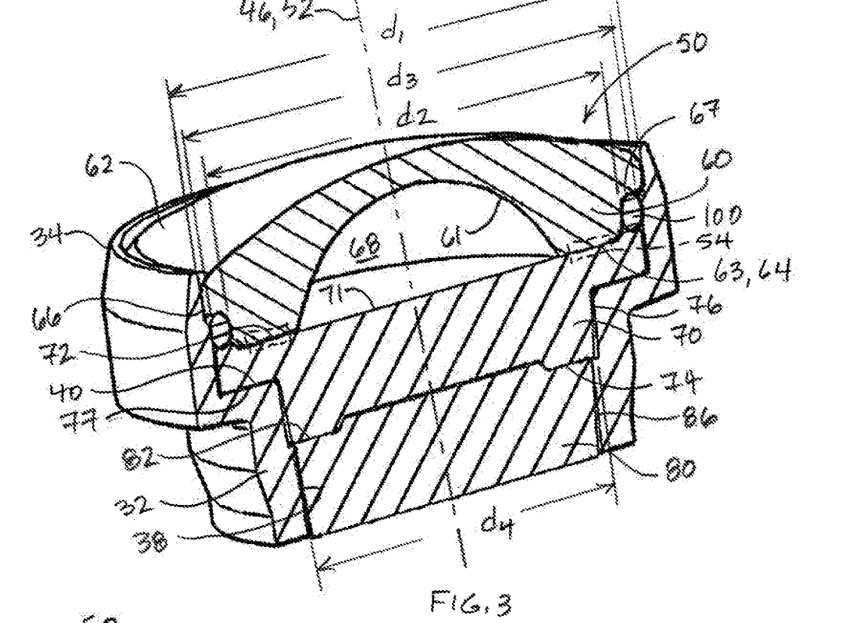
FIG. 3 is a perspective cross-sectional view of a portion of the lens assembly of FIG. 1.
Figure 4:
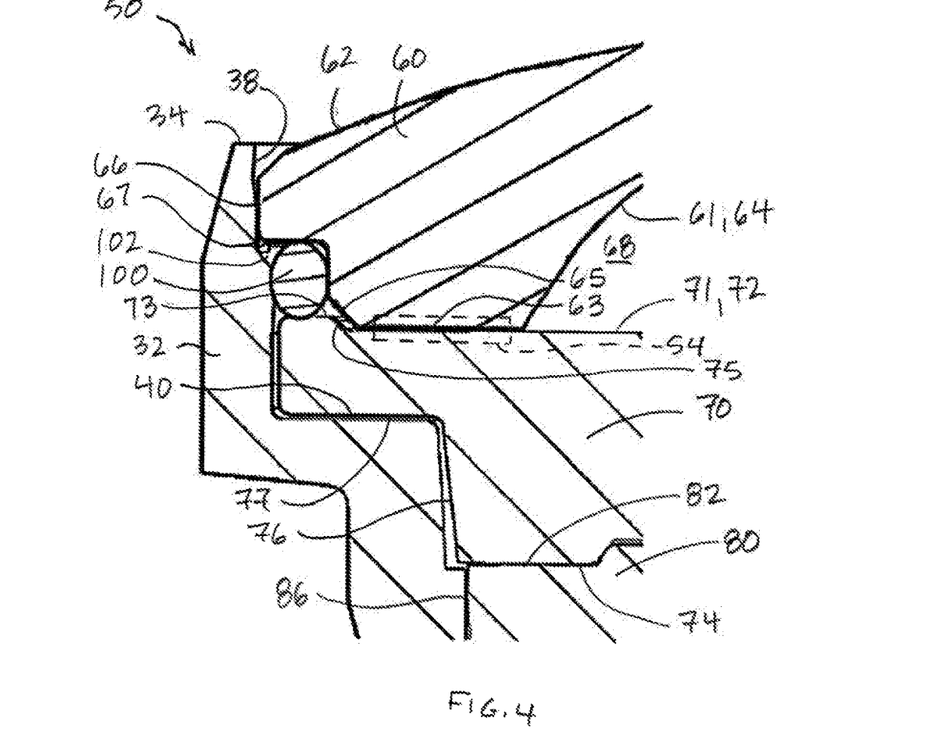
FIG. 4 is an enlarged side cross-sectional view of a portion of the lens assembly of FIG. 1.

Referring to FIGS. 3 and 4, the lens stack 50 includes a first lens 60 disposed in the lens housing open first end 34. The first lens 60 is the outermost lens of the lens stack 50, and includes a first outward facing surface 62, a first inward facing surface 64 that is spaced apart from the first outward facing surface 62, and a first peripheral edge 66 that extends between the first outward facing surface 62 and the first inward facing surface 64. The first peripheral edge 66 faces the inner surface 38 of the lens housing 32.

The first lens 60 has a non-uniform outer diameter such that the diameter d1 of the first lens 60 at the first outward facing surface 62 is greater than the diameter d2 of the first lens 60 at the first inward facing surface 64, and such that a first lens shoulder 67 is formed in the first peripheral edge 66. The diameter d1 of the first lens 60 at the first outward facing surface 62 is set to provide a press fit of the first lens 60 within the lens housing first end 32. The first lens shoulder 67 faces and is spaced apart from the second lens 70.

The first lens 60 is a meniscus lens, and thus the first outward facing surface 62 is outwardly convex and a central portion 61 of the first inward facing surface 64 is concave. The radius of curvature of the first outward facing surface 62 is greater than the radius of curvature of the first inward facing surface central portion 61.

The first inward facing surface 64 includes locating features in the vicinity of the peripheral edge 66 that serve to maintain axial alignment of the first lens 60 with the second lens 70, as discussed further below. In particular, the first inward facing a surface 64 includes a first inclined portion 65 that is formed at the intersection of the first peripheral edge 66 and the first inward facing surface 64. In addition, the first inward surface 64 includes a first planar portion 63 that is disposed between the first inclined portion 65 and the central portion 61. The first inclined portion 65 is acutely angled relative to both the first planar portion 63 and the central portion 61, and the first planar portion 63 is disposed between the first inclined portion portion 65 and the optical axis 52.

The second lens 70 is disposed in the lens housing 32 adjacent to the first lens 60. The second lens 70 includes a second outward facing surface 72 that faces the first lens and abuts the planar portion 63 of the first inward facing surface 64. The second lens 70 includes a second inward facing surface 74 that is spaced apart from the second outward facing surface 72, and a second peripheral edge 76 that extends between the second outward facing surface 72 and the second inward facing surface 74. The second peripheral edge 76 faces the inner surface 38 of the lens housing 32. In the vicinity of the optical axis 52, the second outward facing surface 72 and the second inward facing surface 74 are planar, parallel and transverse to the optical axis 52.

The second lens 70 has a non-uniform outer diameter such that the diameter d3 of the second lens 70 at the second outward facing surface 72 is greater than the diameter d4 of the second lens 70 at the second inward facing surface 74, and such that a second lens shoulder 77 is formed in the second peripheral edge 76. The diameter d3 of the second lens 70 at the second outward facing surface 72 is less than the diameter d1 of the first lens 60 at the first outward facing surface 62, and greater than the diameter d2 of the first lens 60 at the first inward facing surface 64. The second lens shoulder 77 faces and abuts the housing shoulder 40.

The second lens 70 is configured so that the second outward facing surface 72 and the second inward facing surface 74 are planar in the vicinity of the optical axis 52. A space 68 exists between the concave central portion 61 of the first inward facing surface 64 and the planar second outward facing surface 72. In some conventional near range cameras, an in certain operating conditions, undesirable condensation of moisture within the space 68 on the first inward facing surface 64 has been known to occur. The camera 1 includes sealing features which minimize the possibility of such condensation, as will be discussed in detail below.

The second outward facing surface 72 and the second inward facing surface 74 include locating features in the vicinity of the second peripheral edge 76 that serve to maintain axial alignment of the second lens 70 with the adjacent lenses 60, 80 of the lens stack 50. For example, the second outward facing surface 72 includes a second inclined portion 75 that is formed near the second peripheral edge 76. A second peripheral planar portion 73 is disposed between the second peripheral edge 76 and the second inclined portion 75, and a second central planar portion 71 is surrounded by the second peripheral planar portion 73. The second central planar portion 71 is recessed relative to the second peripheral planar portion 73 via the acutely angled second inclined portion 75. In addition, the first inclined portion 65 faces the second inclined portion 75, and the first planar portion 63 faces the second central planar portion 71. In particular, the second central planar portion 71 of the second lens 70 abuts the first planar portion 63 of the first lens 60 so as to provide an annular region of contact 54 between the first lens and the second lens. Thus, the first inward facing surface 64 of the first lens 60 and the second outward facing surface 72 of the second lens 70 each have a non-linear profile when viewed in a cross section that includes the optical axis 52 of the lens stack 50, and the first inward facing surface 64 of the first lens 60 cooperates with the second outward facing surface 72 of the second lens 70 to maintain axial alignment of the second lens 70 with the first lens 60.

The third lens 80 is disposed in the lens housing 32 adjacent to and abutting the second lens 70. The third lens 80 includes a third outward facing surface 82 that faces and abuts the second inward facing surface 74, a third inward facing surface 84 that is spaced apart from the third outward facing surface 82, and a third peripheral edge 86 that extends between the third outward facing surface 82 and the third inward facing surface 84. The third peripheral, edge 86 faces the inner surface 38 of the lens housing 32. In the vicinity of the optical axis 52. The third outward facing surface 82 and the third inward facing surface 84 are planar, parallel and transverse to the optical axis 52.

The third outward facing surface 82 and the second inward facing surface 74 include locating features in the vicinity of the third peripheral edge 86 that serve to maintain axial alignment of the third lens 80 with the adjacent lenses 70, 90 of the lens stack 50. To that end, the second inward facing surface 74 of the second lens 70 and the third outward facing surface 82 of the third lens 80 each have a non-linear profile when viewed in a cross section that includes the optical axis 52 of the lens stack 50, and the the second inward facing surface 74 of the second lens 70 cooperates with the third outward facing surface 82 of the third lens 80 to maintain axial alignment of the second lens 70 with the third lens 80.

Referring again to FIG. 2, the fourth lens 90 is disposed in the lens housing 32 adjacent to the third lens 80. The fourth lens 90 includes a fourth outward facing surface 92 that faces and abuts the third inward facing surface 84, a fourth inward facing surface 94 that is spaced apart from the fourth outward facing surface 92, and a fourth peripheral edge 96 that extends between the fourth outward facing surface 92 and the fourth inward facing surface 94. The fourth lens 90 is a plano-convex lens, and thus the fourth outward facing surface 92 is planar and transverse to the optical axis 52, and a central portion 98 of the fourth inward facing surface 94 is inwardly convex. The convex central portion 98 of the fourth inward facing surface 94 protrudes through the lens housing central opening 44 toward the image sensor 18.

Referring to FIGS. 2 and 4, the camera 1 includes sealing features that reduce the amount of moisture that can enter the camera body and thus minimize moisture condensation within the lens assembly 50 and particularly within the space 68 between the first and second lenses 60, 70. The sealing features include a lens seal 100 and a housing seal 120.

The housing seal 120 is disposed between an outer surface of the housing shoulder 40 and the terminal end of the collar 60. The housing seal 120 may be, for example, an annular elastic gasket such as an O-ring. The housing seal 120 prevents external moisture from entering the camera housing 2 via a path between the lens housing 32 and the collar 6.

The lens seal 100 resides in a space 102 defined by the first lens shoulder 67, the first peripheral edge 66, the inner surface 38 of the lens housing 32, and the second outward facing surface 72. The lens seal 100 may be for example, an annular elastic gasket such as an O-ring. The lens seal 100 is sized and shaped to be slightly larger than the space 102 and thus the lens seal 100 contacts, and forms a seal with, the first lens shoulder 67, the first peripheral edge 66, the inner surface 38 of the lens housing 32, and the second outward facing surface 72. As a result, a sealed space exists between the central portion 61 of the first lens 60 and the outward facing surface 72 of the second lens 70. In addition, the lens seal 100 minimizes or prevents moisture from entering the camera housing 2 via a path that extends between the lens stack 50 and the lens housing 32. Placement of the lens seal 100 radially outward relative to the space 68, and between the first lens shoulder 67 and the second outward facing surface 72 of the second lens 70 thus minimizes exposure of the curved first inward facing surface central portion 61 to external moisture. For example, placement of the lens seal 100 in the space 102 prevents moisture, such as may exist within the camera housing 2 or may permeate through the walls of the camera housing 2 or lens housing 32, from entering the space 68. Placement of the lens seal 100 at this location also permits reduction of the size of the space 68 relative to some conventional lens assemblies, whereby moisture within the space 68 available for condensation is also reduced.

In the embodiment illustrated in FIGS. 2-4, the first lens 60 is formed of glass to provide scratch resistance during use, while the other lenses 70, 80, 90 of the lens stack 50 are formed of plastic. It is contemplated, however, that all the lenses 60, 70, 80, 90 of the lens stack 50 may be formed of the same material (glass, plastic or other appropriate material) or a combination of differing materials, as required by the specific application.

In the illustrated embodiments, the lens stack 50 includes four individual lenses 60, 70, 80, 90 in a stacked arrangement. It is understood that the lens stack 50 may include a greater or fewer number of lenses than shown in the illustrated embodiments, and that use of multiple lenses increases image quality of the image detected via the lenses. It is further understood that the number of lenses included in the stack is determined by the requirements of the specific application.

Figure 5:
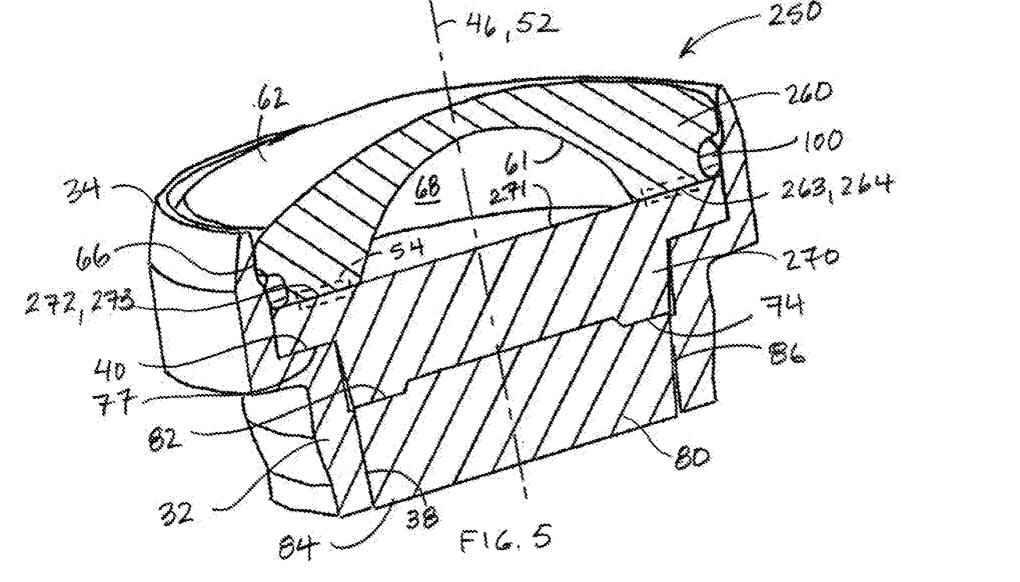
FIG. 5 is a perspective cross-sectional view of a portion of an alternative embodiment lens assembly.
Figure 6:
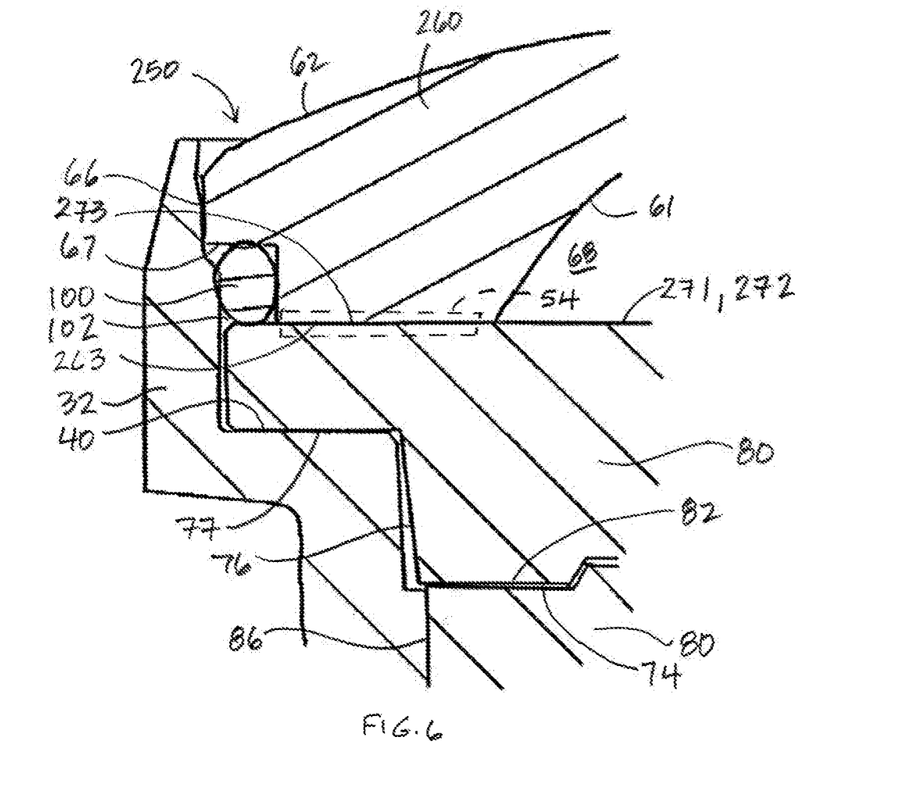
FIG. 6 is an enlarged side cross-sectional view of a portion of the lens assembly of FIG. 5.

Referring to FIGS. 6 and 7, an alternative embodiment lens assembly 230 includes the lens housing 32 that supports an alternative embodiment lens stack 250. The lens stack 250 is similar in form and function to the lens stack 50 described above with respect to FIGS. 2-4, and common elements are referred to using common reference numbers. The lens stack 250 differs from the the the lens stack 50 described above with respect to FIGS. 2-4 with respect to the shape of the first lens 260 and the second lens 270. In the lens stack 250, the first lens 260 and the second lens 270 have the same shape as the corresponding first and second lenses 60, 70 of the earlier described lens stack 50, except that the first lens 260 and the second lens 270 are free of locating features in the vicinity of the peripheral edges 66, 76. More specifically, the first inward facing surface 264 of the first lens 260 is free of an inclined surface, whereby the first inward facing surface 264 includes a first planar portion 263 that extends between the first peripheral edge 66 and the central (concave) portion 61. In addition, the second outward facing surface 272 is free of an inclined portion, whereby the second outward facing surface 272 is planar or flat, e.g., the peripheral planar portion 273 is coplanar with the central planar portion 271.

In the lens stack 250, the lens seal 100 resides in the space 102 defined by the first lens shoulder 67, the first peripheral edge 66, the inner surface 38 of the lens housing 32, and the second outward facing surface 272, 273. The lens seal 100 is sized and shaped to contact, and form a seal with, the first lens shoulder 67, the first peripheral edge 66, the inner surface 38 of the lens housing 32, and the second outward facing surface 272, 273.

The lens stack 250 shown in FIGS. 6 and 7 may be more simple to manufacture than the lens stack 50 shown in FIGS. 2-4, and the lens stack 250 shown in FIGS. 6 and 7 provides a configuration in which it is harder to change the seal compression without changing the relationship between the first and second lenses 260, 270. However, the lens stack 50 may provide better alignment between the first lens 60 and the second lens 70, and may permit tuning of the lens seal touch surface by forming it to be a bit longer or shorter without changing the focus of the assembly.

Although each lens 60, 70, 80, 90, 100 has been described as having a particular shape and/or orientation or ordering within the stack, the lenses 60, 70, 80, 90, 100 are not limited to the described configuration. Rather the selection of shapes of the lenses, the orientation and the ordering of the lenses within the lens stack can vary. In addition, the longitudinal spacing of the lenses within the lens stack can be altered so that gaps exist between one or more pairs of adjacent lenses. The selection of particular lenses and arrangement of lenses is determined by the requirements of the specific application.

In the embodiments described above, the first inward facing surface 64 abuts (e.g., physically contacts) the second outward facing surface 72 in order to provide a more stable joint, for example since any relative micro motion can change the lens focus and can result in a blurry image. However, in other embodiments, the lens assembly may include a washer (not shown) that separates these surfaces and still provides a fixed joint. In still other embodiments, the second lens 70 may be allowed to float relative to the first lens 60 and only be held in place by the lens seal 100 since this is a compressible joint.

Selective illustrative embodiments of the camera lens assembly and camera system are described above in some detail. It should be understood that only structures considered necessary for clarifying the assembly and system have been described herein. Other conventional structures, and those of ancillary and auxiliary components of the assembly and system, are assumed to be known and understood by those skilled in the art. Moreover, while a working example of the assembly and system have been described above, the assembly and system are not limited to the working examples described above, but various design alterations may be carried out without departing from the assembly and system as set forth in the claims.

The invention claimed is:

1. A camera lens assembly comprising
a tubular lens housing having an open end;
a lens stack disposed in the lens housing, the lens stack including
a first lens disposed in the lens housing open end, and
a second lens disposed in the lens housing, the second lens having an outward facing surface that faces an inward facing surface of the first lens; and
a lens seal that contacts, and forms a seal with, an inner surface of the lens housing, the first lens and the second lens,
wherein
the first lens has a peripheral edge that faces the inner surface of the lens housing,
the first lens has a non-uniform outer diameter such that a first lens shoulder is formed in the peripheral edge, the first lens shoulder facing the second lens, and
the lens seal resides in a space defined by the first lens shoulder, the peripheral edge, the inner surface of the lens housing, and the outward facing surface of the second lens.

2. The camera lens assembly of claim 1, wherein the lens seal contacts, and forms a seal with, the first lens shoulder, the peripheral edge, the inner surface of the lens housing and the outward facing surface of the second lens.

3. The camera lens assembly of claim 1, wherein the lens seal is an annular gasket.

4. The camera lens assembly of claim 1, wherein
the lens housing comprises
a first end that defines the open end,
a second end opposed to the first end, and
a non-uniform inner diameter such that a housing shoulder is formed in the inner surface of the lens housing between the first end and the second end, and
the second lens has a peripheral edge that faces the inner surface of the lens housing,
the second lens has a non-uniform outer diameter such that a second lens shoulder is formed in the peripheral edge, and
the second lens shoulder abuts the housing shoulder.

5. The camera lens assembly, of claim 1, wherein
a portion of the second lens abuts a portion of the first lens so as to provide an annular region of contact between the first lens and the second lens; and
the lens seal is disposed at a location that is disposed between the annular region of contact and the lens housing.

6. The camera lens assembly of claim 1, wherein
a central portion of the inward facing surface of the first lens is concave; and
a sealed space exists between the central portion and the outward facing surface of the second lens.

7. The camera lens assembly of claim 1, wherein the first lens and the second lens are each formed of glass.

8. The camera lens assembly of claim 1, wherein the first lens is formed of glass and the second lens is formed of plastic.

9. The camera lens assembly of claim 1, wherein
the lens stack includes a longitudinal axis that extends through a center of each lens of the lens stack, the inward facing surface of the first lens and the outward facing surface of the second lens each have a non-linear profile when viewed in a cross section that includes the longitudinal axis, the inward facing surface of the first lens includes a first planar portion that is transverse to the longitudinal axis, and a first angled portion adjoining the first planar portion that is acutely inclined relative to the first planar portion, and the outward facing surface of the second lens includes a second planar portion that is transverse to the longitudinal axis and a second angled portion adjoining the second planar portion that is acutely inclined relative to the second planar portion, wherein the first angled portion is disposed between the lens seal and the longitudinal axis, and faces the second angled portion, and the first planar portion is disposed between the first angled portion and the longitudinal axis, and faces the second planar portion.

10. A camera comprising
a camera housing having an opening, and
a camera lens assembly disposed in the opening, the camera lens assembly including
  a tubular lens housing having an open end;
  a lens stack disposed in the lens housing, the lens stack including
    a first lens disposed in the lens housing open end, and
    a second lens disposed in the lens housing, the second lens having an outward facing surface that faces an inward facing surface of the first lens; and
  a lens seal that contacts, and forms a seal with, an inner surface of the lens housing, the first lens and the second lens,
  wherein
    the first lens has a peripheral edge that faces the inner surface of the lens housing,
    the first lens has a non-uniform outer diameter such that a first lens shoulder is formed in the peripheral edge, the first lens shoulder facing the second lens, and
    the lens seal resides in a space defined by the first lens shoulder, the peripheral edge, the inner surface of the lens housing, and the outward facing surface of the second lens.

11. The camera of claim 10, wherein the lens seal contacts, and forms a seal with, the first lens shoulder, the peripheral edge, the inner surface of the lens housing and the outward facing surface of the second lens.

12. The camera of claim 10, wherein the lens seal is an annular gasket.

13. The camera of claim 10, wherein
the lens housing comprises
  a first end that defines the open end,
  a second end opposed to the first end, and
  a non-uniform inner diameter such that a housing shoulder is forme e inner surface of the lens housing between the first end and the second end, and
the second lens has a peripheral edge that faces the surface of the lens housing,
the second lens has a non-uniform outer diameter such that a second lens shoulder is formed in the peripheral edge, and
the second lens shoulder abuts the housing shoulder.

14. The camera of claim 10, wherein
a portion of the second lens abuts a portion of the first lens so as to form an annular region of contact between the first lens and the second lens and
the lens seal is disposed at a location that is between the annular region of contact and the lens housing.

15. The camera of claim 10, wherein
a central portion of the inward facing surface of the first lens is concave, and
a sealed space exists between the central portion and the outward facing surface of the second lens.

16. The camera of claim 10, wherein the first lens and the second lens are each formed of glass.

17. The camera of claim 10, wherein the first lens is formed of glass and the second lens is formed of plastic.

18. The camera of claim 10, wherein
the lens stack includes a longitudinal axis that extends through a center of each lens of the lens stack,
the inward facing surface of the first lens and the outward facing surface of the second lens each have a non-linear profile when viewed in a cross section that includes the longitudinal axis,
the inward facing surface of the first lens includes a first planar portion that is transverse to the longitudinal axis and a first angled portion adjoining the first planar portion that is acutely inclined relative to the first planar portion, and
the outward facing surface of the second lens includes a second planar portion that is transverse to the longitudinal axis and a second angled portion adjoining the second planar portion that is acutely inclined relative to the second planar portion, wherein
the first angled portion is disposed between the lens seal and the longitudinal axis, and faces the second angled portion, and
the first planar portion is disposed between the first angled p ion and the longitudinal axis, and faces the second planar portion.

19. A camera lens assembly comprising
a tubular lens housing having an open end;
a leis stack disposed in the lens housing, the lens stack including
  a first lens disposed in the lens housing open end, and
  a second lens disposed in the lens housing, the second lens having an outward facing surface that faces an inward facing surface of the first lens; and
a lens seal that contacts, and forms a seal with, an inner surface of the lens housing, the inward facing surface of the first lens and the outward facing surface of the second lens,
wherein
  the first lens has a peripheral edge that faces the inner surface of the lens housing,
  the first lens has a non-uniform outer diameter such that a first lens shoulder is formed in the peripheral edge, the first lens shoulder facing the second lens, and
  the lens seal resides in a space defined by the first lens shoulder, the peripheral edge, the inner surface of the lens housing, and the outward facing surface of the second lens.

* * * * *

UNITED STATES PATENT AND TRADEMARK OFFICE
CERTIFICATE OF CORRECTION

PATENT NO. : 11,002,937 B2
APPLICATION NO. : 15/915544
DATED : May 11, 2021
INVENTOR(S) : Manushi et al.

Page 1 of 1

It is certified that error appears in the above-identified patent and that said Letters Patent is hereby corrected as shown below:

In the Claims

In Claim 5, at Column 8, Line 48: "lens assembly, of claim 1" should read --lens assembly of claim 1--.

In Claim 9, at Column 9, Lines 6-7: "the longitudinal axis, and" should read --the longitudinal axis and--.

In Claim 13, at Column 9, Line 55: "forme e inner surface" should read --formed in the inner surface--.

In Claim 13, at Column 9, Line 57: "the surface" should read --the inner surface--.

In Claim 18, at Column 10, Lines 37-38: "the first angled p ion" should read --the first angled portion--.

In Claim 19, at Column 10, Line 42: "a leis stack" should read --a lens stack--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*